United States Patent [19]
DeSloovere

[11] 3,766,799
[45] Oct. 23, 1973

[54] GEARSHIFT MECHANISM
[75] Inventor: Bernard G. DeSloovere, Detroit, Mich.
[73] Assignee: General Motors Corporation, Detroit, Mich.
[22] Filed: Nov. 17, 1972
[21] Appl. No.: 307,438

[52] U.S. Cl............................................ 74/473 R
[51] Int. Cl............................................ G05g 7/00
[58] Field of Search.................. 74/473 R, 475, 476, 74/477

[56] References Cited
FOREIGN PATENTS OR APPLICATIONS
946,867   12/1948   France.............................. 74/473 R Primary Examiner—Milton Kaufman
Attorney—Warren E. Finken et al.

[57] ABSTRACT

The drawings illustrate an improved console-type gearshift mechanism for an automatic vehicle transmission, wherein the 1-2 and 2-3 forward speed shifts require just one unidirectional manual force application of a self-centering selector lever, with each forward speed range having a positive detent in both upshift and downshift directions, eliminating any possible overshifts.

8 Claims, 4 Drawing Figures

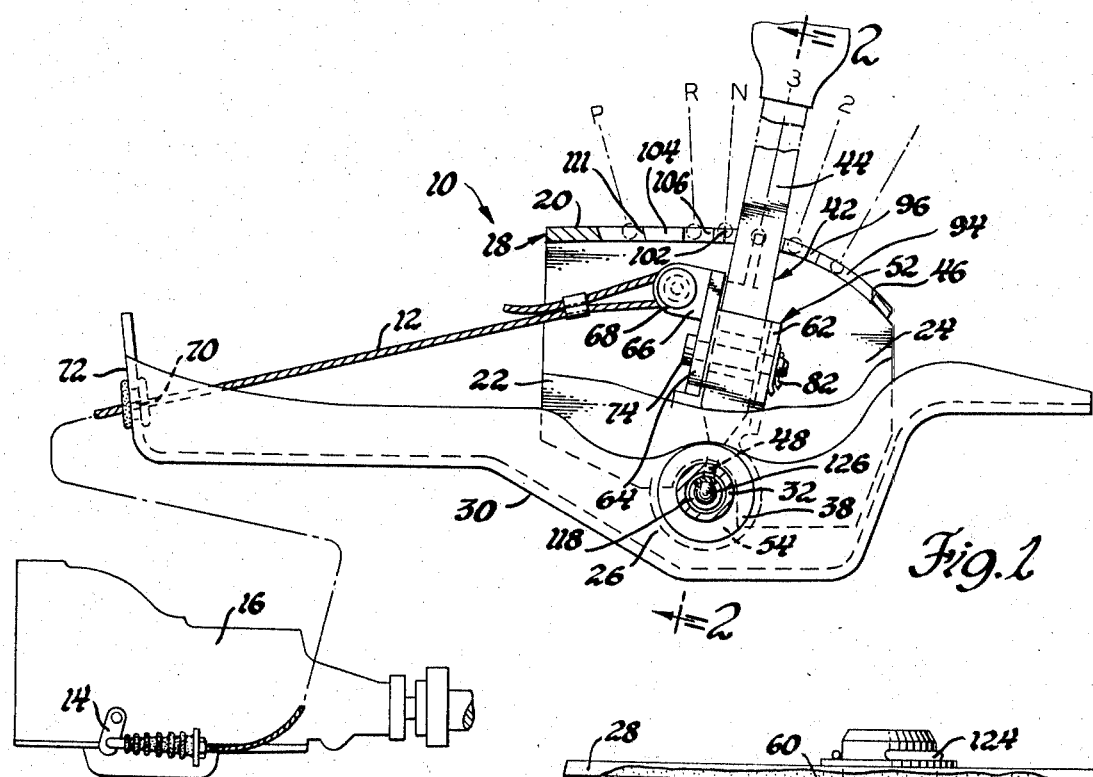

GEARSHIFT MECHANISM

The invention relates generally to gearshift mechanisms and, more particularly, to console-type gearshift mechanisms for automatic transmissions.

Inasmuch as prior console-type gearshift mechanisms have tended to be somewhat complex, generally requiring dual manual force application, i.e., forward and lateral movements, for 1-2 and 2-3 forward speed shifts, it is desirable to have a gearshift mechanism wherein each forward speed range is attained quickly and accurately by a simple unidirectional manual movement.

Accordingly, an object of the invention is to provide an improved simplified gearshift mechanism having the above-described desirable characteristics.

Another object of the invention is to provide an improved gearshift mechanism wherein the shift selector lever is self-centering and each forward speed range has a positive detent in both upshift and downshift directions, eliminating any possible overshifts.

A further object of the invention is to provide a gearshift mechanism including a housing having a contoured opening formed in an upper surface thereof and shaped so as to cooperate with a transversely biased selector lever mounted therethrough to permit short, unidirectional manual movements for all forward speed shifts, the selector lever being additionally axially biased for selective cooperation with toothed and notched segments of the contoured opening to attain Neutral, Reverse, and Park positions.

These and other objects and advantages of the invention will be apparent when reference is made to the following description and accompanying drawings, wherein:

FIG. 1 is a side view of an automatic vehicle transmission gearshift mechanism embodying the invention;

FIG. 2 is a cross-sectional view taken along the plane of line 2—2 of FIG. 1, and looking in the direction of the arrows;

FIG. 3 is a cross-sectional view taken along the plane of line 3—3 of FIG. 2, and looking in the direction of the arrows; and FIG. 4 is a fragmentary top view of a portion of the FIG. 1 structure.

Referring now to the drawings in greater detail, FIG. 1 illustrates a console-type gearshift mechanism 10 operatively connected via a cable 12 to a shift lever 14 of an automatic transmission 16. As shown in FIGS. 1–4, the gearshift mechanism 10 includes a cover member 18 having an upper wall 20 secured to oppositely disposed side walls 22 and 24. The side walls 22 and 24, in turn, are secured along their bottom edges to respective side walls 26 and 28 of a base member 30. A sleeve member 32 is mounted transversely through aligned openings 34 and 36 formed in the respective base member side walls 26 and 28, and retained in place therein by retainer rings 38 and 40 abutting against the outer surfaces of the respective side walls 26 and 28.

A selector lever assembly 42 mounted in the housing formed by the cover and base members 18 and 30, respectively, includes a rectangular cross-sectioned selector lever 44 extending through a contoured opening 46 formed in the upper wall 20 of the cover member 18 and having a narrow inner end 48 (FIGS. 1 and 2) inserted into a slotted opening 49 formed longitudinally along the length of the sleeve member 32. A pair of oppositely tapered side surfaces 50 are formed on the inner end 48 for a purpose to be hereinafter explained.

The selector lever 44 is confined longitudinally, but not transversely, by a bracket assembly 52 within the cover member 18. The bracket assembly 52 includes a pair of oppositely disposed leg members 54 and 56 pivotally mounted around and extending upwardly from the sleeve member 32. Washer-like bearings 58 and 60 serve to separate the leg members 54 and 56 from the respective side walls 22 and 24 of the cover member 18. A U-shaped rear wall 62 of the bracket assembly 52 is secured at the sides thereof to the leg member 54. A forward wall 64 is secured at its ends to the sides of the U-shaped rear wall 62, the walls 62 and 64 thereby serving to confine the selector lever 44 longitudinally so as to be pivotable with the lever 44 on the sleeve member 32. A flanged portion 66 is bent out of the forward wall 64 of the assembly 52, and has a pin member 68 mounted thereon suitable for the connection thereto of the cable 12, the cable 12 extending therefrom through an opening 70 (FIG. 1) formed in a forward wall 72 of the base member 30, and thence to the shift lever 14 of the transmission 12.

A flanged pin member 74 is mounted through a transverse slot 76 formed in the forward wall 64, a vertical slot 78 formed in the selector lever 44, and a transverse slot 80 formed in the rear wall 62 of the assembly 52, and retained therein by a cotter pin 82.

As best illustrated in FIG. 4, the contoured opening 46 in the upper wall 20 of the cover member 18 comprises a left side portion (as would be viewed by the vehicle operator) having stepped straight longitudinal edges 84, 86, and 88 separated by transverse edges 90 and 92. A plurality of interconnected arcuate edges 94, 96, and 98 serve as a rear portion of the contoured opening 46 between the end of the straight edge 84 and an oppositely disposed straight edge 100 of the right side portion of the opening 46. The right side portion further comprises toothed segments 102 and 104 separated by a notch 106. The toothed segment 104 is substantially wider than the toothed segment 102. The forward portion of the contoured opening 46 consists of interconnected arcuate and straight edges 108 and 110, respectively, transversely connecting the forward ends of the toothed segment 104 and straight edge 88, respectively. It may be noted in FIG. 4 that all of the forward edges 108 and 110 and the rear edges 94, 96, and 98 are tapered across the thicknesses thereof at a predetermined angle so as to be wider at the outer or top surface of the upper wall 20 to accommodate the longitudinal pivotal movements of the selector lever 44, while the leading edge 111 of the toothed segment 104 is tapered so as to slope toward the pivot point or axis of the sleeve member 32 to accommodate the positioning of the lever 44 in the Park or "P" position.

A pair of longitudinal notches 112 and 114 (FIG. 3) are formed on the side of the selector lever 44 facing the right side portion of the contoured opening 46, with a transverse notch 115 (FIG. 2) formed thereacross so as to provide a vertical center strip or abutment 116 having a flat upper surface 117. The abutment 116 thus extends through the plane of the contoured opening 46 (FIG. 2) for cooperating with the various edges thereof, as will be hereinafter explained.

As shown in FIG. 2, a pair of coil springs 118 and 120 are mounted in the sleeve member 32 and confined at their exterior ends by suitable retainers, such as the respective cotter pins 122 and 124. The springs 118 and 120 are retained in compression by a pair of ball members 126 and 128, the latter being separated by the oppositely disposed tapered surfaces 50 of the inner end 48 of the selector lever 44.

As may be noted in FIGS. 3 and 4, the balanced free position of the end 48 of the selector lever 44 between the spring-loaded ball members 126 and 128, with respect to the contoured opening 46, is such that the lever 44 is at rest adjacent the straight-stepped edge 86 and the Operation edge 92. In this position, the resultant predetermined pull on the cable 12 serves to position the transmission shift lever 14 in the third gear or third speed ratio position, identified in FIG. 4 as "3." As also noted in FIG. 4, the First ("1") speed ratio position of the selector lever 44 is adjacent the arcuate edge 94, the Second ("2") speed ratio position thereof is adjacent the arcuate edge 96, the Neutral ("N") position having the center abutment 116 of the selector lever 44 adjacent the straight edge 100 and the toothed segment 102, the Reverse ("R") position having the center abutment 116 positioned in the notch 106, and the Park ("P") position having the center abutment 116 positioned adjacent the arcuate edge 108 and the toothed segment 104. Each of the ratio positions "1", "N", "R", and "P" of the selector lever 44 is biased by the action of the springs 118 and 120 on one or the other of the surfaces 50 of the end 48 of the lever 44.

OPERATION

Assume now that the vehicle equipped with the automatic transmission 16 and the console-type gearshift mechanism 10 is being operated in Third ("3") gear. The selector lever 44 will thus be positioned as illustrated in FIGS. 1, 3, and 4. Should it become desirable to shift to a lower gear, for a steep grade, for example, the lever 44 is shifted to "Low" or First ("1") gear position by manually moving the lever rearwardly to the arcuate edge 96, then leftwardly, against the force of the spring 120, to the straight edge 84, pivoting about the pin member 74, the latter being positioned in the left-hand portion (FIG. 2) of the transverse slots 76 and 80 of the respective walls 64 and 62 of the bracket assembly 52, and then rearwardly again along the edge 84 to the First ("1") position against the arcuate edge 94. The lever 44 is retained longitudinally against the arcuate edge 94 by the load on the cable 12 due to the usual detent arrangement (not shown) within the transmission 16.

The shift from First to Second gear or the 1-2 shift is simply straight ahead to the transverse edge 90, at which point, the spring 118 will urge the selector lever 44 rightwardly to the Second ("2") position adjacent the arcuate edge 96, the pin member 74 remaining in the left-hand portion (FIG. 2) of the transverse slot 76, again being retained in place longitudinally by the load on the cable 12. The 2-3 shift to "High" or Third gear again is then merely straight ahead a short distance to the "3" position adjacent the edges 86 and 92, as previously indicated, to again be retained adjacent the edges 86 and 92 by the transmission load on the cable 12.

Should it become desired to shift into Neutral ("N"), the selector lever 44 need only be moved rightwardly along the arcuate edge 98, the pivot pin 74 (FIG. 2) thus being caused by the vertical slot 78 to move into the right-hand portion of the transverse slots 76 and 80, and then forwardly along the straight edge 100, until the center abutment 116 contacts the toothed segment 102.

The shift into Reverse ("R") from Third, for example, is as indicated above for Neutral ("N"), followed by manually depressing the lever 44 so as to cause the tapered surfaces 50 of the inner end 48 of the lever 44 to spread the ball members 126 and 128 against the force of the springs 118 and 120 until the upper portion of the vertical slot 78 (FIG. 2) in the selector lever 44 contacts the pin member 74, at which point the upper surface 117 of the center abutment 116 is moved forwardly beneath the toothed segment 102, and then released to assume a restrained Reverse ("R") position in the notch 106.

Movement of the selector lever 44 to Park or "P" position is similar to that described above relative to Reverse ("R") operation, except that the lever 44 is maintained in a depressed state while the upper surface 117 of the center abutment 116 is moved farther forward beneath the tooth segment 104 and then released, with the center abutment 116 assuming a restrained position adjacent the arcuate edge 108 and the tapered forward edge 111 of the toothed segment 104.

Conversely, upon start-up of the engine, the shift from Park ("P") to Third ("3"), requires a manual depression of the lever 44, again moving the slot 78 (FIG. 2) downwardly on the pin member 74, compressing both springs 118 and 120, and then moving the depressed lever 44 rearwardly into contact with the arcuate sloped edge 98, at which point the spring 118 will urge the end 48 to the right (FIG. 2), thus pivoting the selector lever 44 about the pin member 74, leftwardly into the Third or "3" position (FIGS. 3 and 4).

It should thus be apparent that the invention provides means for rapid, accurate transmission-shift operation, each forward speed range requiring merely a simple unidirectional manual movement. Further, it is apparent that the invention utilizes a minimal number of uncomplicated components.

While but one embodiment of the invention has been shown and described, other modifications thereof are possible.

I claim:

1. A transmission gearshift mechanism comprising:
   a. a housing;
   b. bracket means pivotally mounted in said housing so as to be pivotable in a longitudinal direction with respect to said housing;
   c. a transmission shift lever cable connector mounted on said bracket means;
   d. a selector lever pivotally mounted in said housing so as to be pivotable in a transverse direction with respect to said bracket means and confined at an intermediate point thereof by said bracket means in said longitudinal direction, said bracket means and said cable connector being thus pivotable in said longitudinal direction upon manual actuation of said selector lever in said longitudinal direction;
   e. biasing means for urging the inner end of said selector lever into a centered position in said transverse direction; and
   f. a contoured opening formed in said housing around said selector lever for guiding said selector lever and permitting, in cooperation with said biasing means, unidirectional manually-actuated movements of said selector lever for 1-2 and 2-3 forward speed shifts.

2. The transmission gearshift mechanism described in claim 1, and lost-motion means operatively connected to said bracket means and said selector lever, said biasing means cooperating with said lost-motion to permit said selector lever to be manually axially actuated to attain neutral, reverse, and park positions within said contoured opening.

3. A transmission gearshift mechanism comprising:
   a. a housing;
   b. a bracket having forward and rear walls interconnected by oppositely disposed side walls and a downwardly extending leg formed on each of said side walls, each of said legs being pivotally mounted in said housing so as to permit said bracket to be pivotable in a longitudinal direction with respect to said housing;
   c. a transmission shift lever cable connector mounted on said forward wall of said bracket;
   d. a pivot pin extending between said forward and rear walls;
   e. a selector lever pivotally mounted at an intermediate point thereof on said pivot pin so as to be pivotable about said pivot pin between said side walls and confined by said forward and rear walls, said bracket and said cable connector being thus pivotable in said longitudinal direction upon manual actuation of said selector lever in said longitudinal direction;
   f. biasing means for urging the inner end of said selector lever in a transverse direction tending to cause said selector lever to attain a position having its axis parallel to said side walls; and
   g. a contoured opening formed in said housing around said selector lever serving as a guide and a limiter for said selector lever and permitting said selector lever to be manually moved to selected longitudinal and transverse positions within said contoured opening to thereby selectively position said cable connector in longitudinal positions corresponding to desired transmission speed ratios.

4. A transmission gearshift mechanism comprising a housing including a cover member and a base member, a contoured opening formed in said cover member, said opening providing for first gear ratio position in one longitudinal plane, second and third gear ratio positions in a second longitudinal plane, and neutral, reverse and park positions in a third longitudinal plane, a sleeve member mounted transversely across said base member, a slot formed along the length of said sleeve member, a bracket pivotally mounted on said sleeve member within said housing, a selector lever pivotally mounted on said bracket so as to be pivotable transversely relative thereto while being confined longitudinally thereby, said selector lever extending upwardly from said bracket through said contoured opening and downwardly therefrom with the end thereof extending through said slot into said sleeve member, a transmission shift lever cable connector formed on said bracket, a pair of ball members mounted in said sleeve member on opposite sides of said end of said selector lever, and a pair of springs mounted in said sleeve member so as to be compressed between said respective ball members and oppositely disposed end retainer members formed on said sleeve member, thereby tending to center said end of said selector lever in said sleeve member.

5. A transmission gearshift mechanism comprising a housing including a top wall, a base member, and a pair of oppositely disposed side walls for securing said top wall to said base member, a contoured opening formed in said top wall, said opening providing for first gear ratio position in one longitudinal plane, second and third gear ratio positions in a second longitudinal plane, and neutral, reverse, and park positions in a third longitudinal plane, a sleeve member mounted transversely across said base member, a slot formed along the length of said sleeve member, a bracket pivotally mounted on said sleeve member within said housing and having interconnected forward, rear and side walls, a selector lever pivotally mounted on said bracket so as to be pivotable between said side walls while being confined between said forward and rear walls, said selector lever extending upwardly from said bracket through said contoured opening and downwardly therefrom with the end thereof extending through said slot into said sleeve member, a transmission shift lever cable connector formed on said forward wall of said bracket, a pair of ball members mounted in said sleeve member on opposite sides of said end of said selector lever, and a pair of springs mounted in said sleeve member so as to be compressed between said respective ball members and oppositely disposed end retainer members formed on said sleeve member, thereby tending to center said end of said selector lever in said sleeve member and position said selector lever in a parallel relationship with said side walls.

6. The transmission gearshift mechanism described in claim 5, and lost-motion means operatively connected to said bracket and said selector lever, said springs cooperating with said lost-motion means to permit said selector lever to be manually axially actuated while being pivotally moved along said third longitudinal plane to selectively attain said neutral, reverse, and park positions therealong.

7. The transmission gearshift mechanism described in claim 6, and a vertical abutment member formed on a side of said selector lever, and a plurality of alternately spaced teeth and notched segments formed along said third longitudinal plane, said vertical abutment member selectively cooperating with said teeth and notch segments during said pivotal and axial manual movement of said selector lever to attain said neutral, reverse, and park positions.

8. A transmission gearshift mechanism comprising a housing including a top wall, a base member, and a pair of oppositely disposed side walls for securing said top wall to said base member; a contoured opening formed in said top wall, said opening providing for first gear ratio position in one longitudinal plane, second and third gear ratio positions in a second longitudinal plane, and neutral, reverse, and park positions in a third longitudinal plane; a plurality of notch portions formed along said third longitudinal plane for establishing said neutral, reverse, and park positions therealong; a sleeve member mounted transversely across said base member; a slot formed along the length of said sleeve member; a bracket having interconnected forward, rear and side walls, said side walls being pivotally mounted on said sleeve member within said housing; oppositely disposed horizontal slots formed in said forward and rear walls; a pivot pin mounted in said horizontal slots; a selector lever having a vertical slot formed therein and aligned with said horizontal slots for pivotally mounting on said pivot pin so as to be pivotable between said side walls of said bracket while being confined between said forward and rear walls, said selector lever extending upwardly from said bracket through said contoured opening and downwardly therefrom with the end thereof extending through said slot into said sleeve member; a vertical abutment formed along one side of said selector lever for selective cooperation with said plurality of notch portions; a transmission shift lever cable connector formed on said forward wall of said bracket; a pair of ball members mounted in said sleeve member on opposite sides of said end of said selector lever; and a pair of springs mounted in said sleeve member so as to be compressed between said respective ball members and oppositely disposed end retainer members, thereby tending to center said end of said selector lever in said sleeve member and position said selector lever in a parallel relationship with said side walls; said selector lever being manually pivotable along said longitudinal planes by virtue of the pivotable mounting of said bracket on said sleeve member, and being manually pivotable in a transverse direction about said pivot pin against the force of either of said pair of springs, and being axially movable for positioning in said notch portions by virtue of being movable on said pivot pin along said vertical slot against the force of said pair of springs on said end of said selector lever.

* * * * *